United States Patent [19]

Chuang

[11] Patent Number: 5,280,092
[45] Date of Patent: Jan. 18, 1994

[54] LACTAM-CONTAINING EMULSIFIER SYSTEMS FOR WATER-IN-OIL EMULSION POLYMERS

[75] Inventor: Jui-Chang Chuang, Wayne, N.J.

[73] Assignee: ISP Investments Inc., Wilmington, Del.

[21] Appl. No.: 3,770

[22] Filed: Jan. 13, 1993

Related U.S. Application Data

[62] Division of Ser. No. 760,272, Sep. 16, 1991, Pat. No. 5,206,316.

[51] Int. Cl.$^5$ ............................ C08F 2/32; C08F 2/44; C08F 20/06; C08F 22/02
[52] U.S. Cl. ................................ 526/201; 526/204; 526/317.1; 526/318.2
[58] Field of Search ................ 526/201, 204, 317.1, 526/318.2

[56] References Cited

U.S. PATENT DOCUMENTS 4,906,701  3/1990  Clark, Jr. ........................ 526/207

Primary Examiner—Bernard Lipman
Assistant Examiner—Wu C. Cheng
Attorney, Agent, or Firm—Jules E. Goldberg; Marilyn J. Maue; Joshua J. Ward

[57] ABSTRACT

An emulsifier for an inverse emulsion polymerization to be produce a water-soluble polymer composed of a mixture of a non-ionic oil-soluble surfactant and an N-alkyl lactam or polymer of a N-vinyl lactam. The emulsifier is extremely useful in polymerizations wherein a water-in-oil polymeric product is obtained since the product is easily inverted to a stable oil-in-water emulsion. Methods for polymerization processes using the inventive emulsifier as well as emulsions obtained therefrom are also disclosed.

20 Claims, No Drawings

LACTAM-CONTAINING EMULSIFIER SYSTEMS FOR WATER-IN-OIL EMULSION POLYMERS

This is a division of application Ser. No. 07/760,272, filed Sep. 16, 1991 now U.S. Pat. No. 5,206,316.

BACKGROUND OF THE INVENTION

I. Field of the Invention

This invention relates to a novel lactam-containing emulsifier system for water-in-oil emulsion polymers. It further relates to a method for carrying out an inverse emulsion polymerization, and product obtained therefrom.

II. Description of the Prior Art

A variety of water-soluble polymers are produced by precipitation polymerization. Typical of such polymers are crosslinked polyacrylic acid, such as, the Carbopol® resins of B.F. Goodrich, which have been widely used as thickeners for aqueous systems. The unique thickening efficiency and rheological properties of these resins are attributed to the incorporation of an allyl crosslinker, such as, polyallyl sucrose or polyallyl pentaerythritol. With this technique, the polymer is usually produced in an organic solvent, e.g., benzene or ethyl acetate, from which it precipitates and is recovered in the form of a powder. This presents a number of problems. For example, often residual organic solvent as well as unreacted monomer may be retained in the separated resin particles. For most end uses, these residual materials cannot be tolerated. In particular, these polymers are often used as thickeners in personal care products. The presence of such toxic solvents or monomers renders the polymer unusable for this purpose, unless it is first treated to remove the impurities. Such treatments not only increase processing time, but significantly increase the processing cost.

Additionally, because the polymeric product is obtained in particulate form, and since it is normally utilized because of its water-soluble properties, the particles must again be redissolved into the end use composition. Such mixing and redissolving generally require rather complex mixing equipment which often is not available at the site of end use.

Additionally, the polymer is obtained in acid form and must be neutralized before it can be used in a personal care product. The neutralization step is required to obtain the thickening properties of the polymer. This again requires another processing step, adding to the cost of the use of the product.

Another important process for making water-soluble polymers on a production scale is inverse emulsion polymerization. However, the water-in-oil emulsion polymers obtained from this process often contain small amounts of unreacted monomers and hydrocarbon oils which may not be of the highest purity. The monomer and hydrocarbon oil toxicity and offensive odor prevent such polymers from being used in personal care and health care products.

In a typical inverse emulsion polymerization, a water-in-oil monomer emulsion is produced by adding a water phase of an aqueous solution of monomers, to an oil phase containing an oil-soluble surfactant under rapid agitation. The monomer emulsion is then homogenized to obtain the proper particle size and then subjected to polymerization conditions to form a water-in-oil polymer emulsion using a water-soluble or water-insoluble initiator. Thereafter, a high HLB value surfactant is incorporated into the polymer emulsion to convert it into an oil-in-water system. This inverse emulsion polymerization process has the advantages of producing polymers of a high molecular weight at a high polymerization rate compared to polymer from a typical solution or precipitation polymerization process of the same monomer.

Although the inverse emulsion polymerization process has the above noted advantages many problems, such as, poor emulsion stability, incomplete polymerization, difficulty of self-inversion, and high oil contents in the products remain to be solved.

A variety of emulsifiers (surfactants or surface active agents) are used for the emulsification, sorbitan monooleate being one of the most popular and readily available. While these form stable emulsions, the polymer emulsion has a very high bulk viscosity and is very difficult to be self-inverted in water.

United States patents relating to the foregoing include:

U.S. Pat. No. 3,826,771 discloses the use of sorbitan monooleate and sorbitan monostearate as the water-in-oil emulsifying agents.

U.S. Pat. No. 3,278,506 discloses the use of ethylene oxide condensates of fatty acid amides as the emulsifiers.

U.S. Pat. No. 4,024,097 discloses the use of surfactant systems consisting of an oil-soluble alkanolamide (e.g. Witcamide 511, Witco Chemical) and one or more co-emulsifiers of unesterified dialkanol fatty amide, salts of fatty tertiary amines, quaternized ammonium salts of fatty tertiary amines, alkali metal salts of fatty acids, and alkyl or alkyl aryl sulfates or sulfonates.

U.S. Pat. No. 4,672,090 and 4,772,659 both disclose a surfactant system for water-in-oil emulsions comprising an oil-soluble alkanolamide, a polyoxyethylene derivative of a sorbitan ester, and sorbitan monooleate.

SUMMARY OF THE INVENTION

We have discovered a method for avoiding the above noted problems in inverse emulsion polymerization processes utilizing a novel emulsifier which has an HLB value no greater than 7. In addition, we have discovered a composition which is easily produced by inverse emulsion polymerization, and is immediately usable without further purification or processing.

The inventive composition is obtained by polymerizing a water-soluble monomer of a water-soluble polymer in a water phase present in a water-in-oil emulsion and in the presence of an emulsifier comprising a mixture of a nonionic oil soluble surfactant and a compound which may be a N-alkyl lactam or polymers of alkylated N-vinyl lactams. The N-alkyl lactam has the formula:

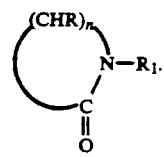

wherein
R is hydrogen or an alkyl having from 1 to 18 carbon atoms and may vary between different —(CHR)— groups;

$R_1$ is a linear, branched or cyclic alkyl having from 6 to 18 carbon atoms with the proviso that at least one of R or $R_1$ must contain at least six carbon atoms and the sum of the carbon atoms in R and $R_1$ cannot exceed 18; and n is 3, 4, or 5.

The polymer of the alkylated N-vinyl lactam has the formula:

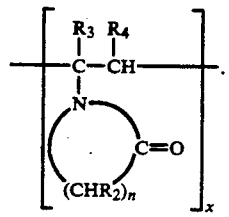

wherein $R_3$ and $R_4$ may be the same or different and may be hydrogen or an alkyl group containing from 6 to 30 carbon atoms and $R_2$ is hydrogen or a linear, branched, or cyclic alkyl having from 1 to 30 carbon atoms and may different —(CHR)— groups;

with the proviso that at least one of $R_2$, $R_3$, or $R_4$ is alkyl;

n is 3, 4 or 5; and x is such that the molecular weight of the polymer is from about 2,000 to 20,000.

The novel emulsifier of the present invention has an HLB value of no greater than 7.

The water-in-oil emulsions obtained by the inventive process can easily be diluted with aqueous systems to invert the emulsion to an oil-in-water emulsion to which various active ingredients, e.g., skin care agents, hair care agents, and the like, can be added.

The inventive emulsifier compositions and process provide improved features, e.g., monomer emulsion stability, lower monomer emulsion viscosity as well as lower polymer emulsion viscosities. It also produces emulsion polymers having extremely low residual monomer levels.

DETAILED DESCRIPTION OF THE INVENTION

The process of the present invention comprises forming a polymerization mixture of an appropriate monomer for an water-soluble polymer as a water-in-oil emulsion, the monomer being in the water phase. An initiator may be added to the polymerization mixture. Also, both an emulsifier comprising a non-ionic oil-soluble surfactant, and a compound selected from the group consisting of N-alkyl lactams or polymers of alkylated N-vinyl lactams are added to the polymerization mixture.

As the nonionic surfactant, known oil-soluble nonionic surfactants can, in general, be used with success in practicing the present invention. However, preferred are those nonionic oil-soluble surface active agents which have a molecular weight of from about 300 to about 10,000, even more preferably from 400 to 8,000. The following nonionic oil-soluble surface active agents are illustrative of those which can be used:

polyethylene glycol alkyl esters, glycerine monoalkyl esters, sorbitan monoalkyl esters, saccharose esters, and the like;

polyoxyalkylene alkyl ether, polyoxyalkylene alkyl aryl ether, and the like;

polyoxyalkylene alkylamide, aliphatic ethanolamide, methylolamide, and the like; and polyoxyalkyl sorbitan alkyl ester, polyoxyalkylene glycol alkyl ester, and the like.

Particularly preferred are the sorbitan mono or polyalkyl esters. Commercially available oil-soluble nonionic surface active agents available are Span 80 or Tween 81 from ICI Americas.

As used herein, the term "alkyl" when used to define an R group in a structural formula means linear, i.e., straight, branched or cyclic alkyl, unless otherwise specified.

Preferably, the N-alkyl lactam is selected from the group consisting of pyrrolidones having the formula

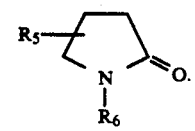

wherein $R_5$ is hydrogen or lower alkyl having from 1 to 4 carbon atoms and $R_6$ is lower alkyl having from 6 to 18 carbon atoms.

Most preferably, the N-alkyl lactam in the inventive emulsifier is an alkylpyrrolidone having an alkyl portion containing from 6 to 18 carbon atoms, e.g., octylpyrrolidone, dodecylpyrrolidone, or N-(2-ethylhexylpyrrolidone), and combinations thereof. The alkyl portion may be distributed at one or more sites on the ring so long as one portion contains at least 6 carbon atoms and the total number of alkyl carbon atoms does not exceed 18. For each of the above examples, the 6 to 18 carbon alkyl portions may be straight, branched, or cyclic, with straight chains being preferred.

Suitable for use as the polymer of an N-vinyl lactam are alkylated polyvinyl pyrrolidones. Typically, these would possess the structure:

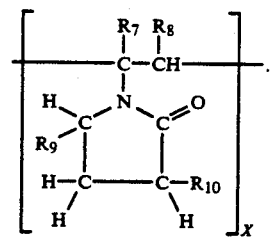

wherein $R_7$ and $R_8$ may be the same or different and may be either an alkyl group or hydrogen. The alkyl group may contain from 6 to 30 carbon atoms.

$R_9$ and $R_{10}$ may be the same or different and may be hydrogen or an alkyl group having from 6 to 30 carbon atoms, with the proviso that at least one of $R_7$, $R_8$, $R_9$ or $R_{10}$ must be alkyl.

X is such that the molecular weight of the polymer is from about 2,000 to 20,000.

Such polymers are sold by GAF Chemicals Corporation under the Trademark GANEX ®.

The ratio of the oil-soluble nonionic surfactant to the lactam component may vary. However, the HLB value of the emulsifier as added should be no greater than about 7. Preferably, the HLB value is less than about 6 and most preferably, no more than 5. The relative amounts of the lactam and nonionic surfactant may be varied to achieve the required overall HLB value. Generally, the ratio of surfactant to lactam is in the range from about 4:1 to 1:2 on a weight basis. By utilizing an emulsifier in accordance with the present invention and having the required HLB value, a water-in-oil polymerization product is obtained which is easily and readily converted into an oil-in-water product ready for use by simple mixing with an appropriate aqueous surfactant solution.

Thus, the product from the polymerization may be conveniently admixed with an aqueous solution of a conventional water-soluble surfactant having an HLB value of at least about 9, e.g., an ethoxylated nonylphenol surfactants. Preferred for use as such surfactants are polyoxyalkylene alkyl aryl ether, and polyoxyalkylene sorbitan alkyl ester.

Polyoxyalkylene alkylaryl ethers are represented by the following formula (V)

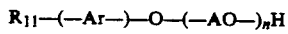

wherein $R_{11}$ is a branched or straight alkyl group containing 4 to 20 carbon atoms, e.g., butyl, t-butyl, octyl, $\gamma$-butyloctyl, and the like; Ar is a phenyl or naphthyl group; —(—AO—)— is an alkylene oxide group containing 2 or 3 carbon atoms, i.e., ethylene oxide or propylene oxide; and n is an integer of 5 to 100, preferably 15 to 50. Of those ethers represented by formula (V), a polyoxyethylene alkylphenyl ether is particularly preferred.

Polyoxyalkylene sorbitan alkyl ester is represented by the following formula (VI):

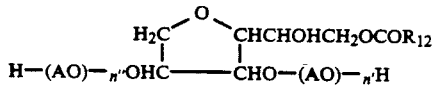

wherein —(AO—)— is the same as defined above;
$R_{12}$ is a branched or straight alkyl group, e.g., dodecyl, pentadecyl, heptadecyl, and the like; and n', and n'' are each integers of 5 to 100.

Of those represented by formula (VI), polyoxyethylene sorbitan alkyl ester is preferred to provide the inverted oil-in-water composition. Various active agents, e.g., hair care agents, skin care agents and the like may be admixed with the oil-in-water emulsion product to produce the final end use product.

The initiator systems which can be used in the present process include those which are conventional in the art. However, we have found that for products whose end use is in the personal care area, e.g., cosmetic, skin care, or hair care, and the like, a t-butyl hydroperoxide/ascorbic acid redox initiation system is preferred.

Numerous water soluble polymers may be prepared utilizing the inventive process. These include, for example, polymers and copolymers of acrylic acid, methacrylic acid, itaconic acid, maleic acid, fumaric acid and the like. Normally, aqueous solutions of the monomer from which these polymers are made are acidic and have a pH in the range from about 2 to 3. Particularly preferred, however, are the water-soluble salts of polyacrylate polymers which are suitable for use in the personal care end use areas.

The lightly crosslinked water-in-oil polymer emulsions of the invention exhibit high thickening efficiency in aqueous systems with the desired rheological properties. Instant thickening is easily achieved by self-inverting in the water system. The novel emulsifier system and redox initiator converts a water-in-oil monomer emulsion into a water-in-oil polymer emulsion This water-in-oil polymer emulsion can be easily and effectively converted by dilution with at least an equal amount of water on a volume basis. Preferably, the amount of water used is at least about 25 times the amount of the water-in-oil emulsion. The residual monomer content in the water-in-oil polymer emulsion is extremely low, (less than the 500 ppm limit detectable by HPLC or the 1000 ppm limit detectable by GC). These water-in-oil polymer emulsions, are particularly useful as thickening agents in personal care products because of the substantial absence of unreactive monomers, the presence of which can be a health hazard. Additionally, the emulsion thickeners containing a lactam based surfactant or dispersant provide the desired smooth, soft, creamy feel which is beneficial to personal care products such as lotions, gels, and creams.

The following examples illustrate the invention (in the examples, all proportions are by parts by weight, unless otherwise designated):

EXAMPLE 1

This example illustrates the preparation of a crosslinked water-in-oil emulsion of poly(sodium acrylate) of the present invention using a combination of sorbitan monooleate (Span 80) and N-octylpyrrolidone (Surfadone ® LP-100) as the emulsifier and methylenebisacrylamide as a crosslinker.

Into a one-liter jacketed resin kettle, equipped with a Gifford-Wood homogenizer (Model IL-87), an oil phase consisting of 74 g of Carnation light mineral oil (Witco Corp.), 1.50 g of N-octylpyrrolidone (GAF), and 4.50 g of sorbitan monooleate (ICI) was prepared. In a separate 800-ml beaker a water phase consisting of 320 g of sodium acrylate (38% in water, pH 7.0), 0.0122 g of methylenebisacrylamide, 0.0200 g of tetrasodium salt of ethylenediamine tetraacetic acid trihydrate (Cheelox BF-78, GAF) and 0.0800 g of t-butyl hydroperoxide was also prepared. The water phase was then transferred into a 500-ml dropping funnel. After starting the homogenizer, the water phase was fed into the oil phase over an 8 minute period, and the reactants were homogenized for another 15 minutes to form a water-in-oil monomer emulsion. The stable emulsion had a Brookfield viscosity of 1,100 cps and was warmed to 35° C. Water, at a temperature of 35° C., was circulated in the jacket of a jacketed resin kettle equipped with a reflux condenser, a mechanical agitator (250 rpm), a nitrogen inlet tube, and a thermometer. The reactants were purged with nitrogen (150 ml/min.) for 30 minutes and kept under a nitrogen atmosphere throughout the experiment. A total of 8.0 ml of a 0.5% ascorbic acid solution was metered with the reactants over an 4 hour period. An exothermic reaction was observed after 10 minutes and the reaction reached the exothermic peak temperature of 43° C., 30 minutes later. At the end of the reaction, the residual sodium acrylate content by the GC method (measured in terms of acrylic acid and methyl acrylate) was below the 0.1% detection limit.

A mixture of 20 g of a 1% solution of Igepal CO-630 (polyethoxylated nonylphenol) was prepared and diluted with 373.33 g of water. To this mixture, 6.67 g of the water-in-oil emulsion obtained from the foregoing polymerization was added and the mixture agitated. Within five minutes, inversion occurred to produce a gel containing 0.5 percent by weight of crosslinked sodium polyacrylate.

The poly(sodium acrylate) water-in-oil emulsion polymer at 29.8% solids had a Brookfield viscosity of 8,000 cps at 25° C. The inverted poly(sodium acrylate) in water at 0.5 and 1.0% by weight based on solid polymer had a Brookfield viscosity of 5,400 and 14,200 cps, respectively, at 25° C.

EXAMPLES 2-8

Examples 2-8 illustrate the preparation of crosslinked water-in-oil emulsions of poly (sodium acrylate) of the present invention using a combination of sorbitan monooleate (Span 80) and N-octylpyrrolidone (Surfadone ® LP-100 - GAF) as the emulsifier, and monoallyl maleate as the crosslinker.

The preparation method of Example 1 was repeated except that 0.0122 g of methylenebisacrylamide (0.01% on monomer) was replaced with various amounts of monoallyl maleate (MAN) as the crosslinker. At the end of each reaction, the residual sodium acrylate content, measured by the GC method (measured in terms of acrylic acid and methyl acrylate), was found to be below the 0.1% detection limit. The solids content for each poly(sodium acrylate) water-in-oil emulsion was 29.8%. The results were as follows:

| Example | % MAM on Monomer | Brookfield Viscosity at 25° C., cps | | | |
|---|---|---|---|---|---|
| | | Monomer Emulsion | Polymer Emulsion | 0.5% in Water | 1.0% in Water |
| 2 | 0.75 | 1,700 | 12,000 | 9,600 | 22,000 |
| 3 | 1.00 | 1,350 | 8,000 | 12,950 | 27,500 |
| 4 | 1.25 | 1,400 | 15,100 | 9,200 | 17,400 |
| 5 | 1.50 | 1,000 | 7,000 | 14,200 | 70,000 |
| 6 | 1.75 | 1,400 | 10,800 | 12,800 | 38,000 |
| 7 | 2.00 | 600 | 6,000 | 16,000 | 34,500 |
| 8 | 2.50 | 1,400 | 8,300 | 10,200 | 60,000 |

EXAMPLE 9

Example 9 illustrates the preparation of cross-linked water-in-oil emulsions of poly(sodium acrylate) of the present invention using a combination of sorbitan monooleate (Span 80 - ICI) and an alkylated poly(N-vinyl-2-pyrrolidone) (Ganex ® V-216 - GAF) as the emulsifier, and monoallyl maleate as the crosslinker.

The preparation method of Example 1 was repeated, except that 1.50 g of N-octylpyrrolidone was replaced with 1.50 g of Ganex ® V-216, and 0.0122 g of methylenebisacrylamide (0.01% on monomer) was replaced with 1.824 g of monoallyl maleate (1.5% on monomers) as the crosslinker. At the end of the reaction, the residual sodium acrylate content was measured by the GC method (measured in terms of acrylic acid and methyl acrylate), and found to be below the 0.1% detection limit. The poly(sodium acrylate) water-in-oil emulsion at 29.8% solids had a Brookfield viscosity of 17,000 cps at 25° C. The inverted poly(sodium acrylate) emulsion in water at 0.5% and 1.0% had a Brookfield viscosity of 4,100 and 17,000 cps, respectively, at 25° C.

EXAMPLE 10

Example 10 illustrates the preparation of cross-linked water-in-oil emulsions of poly(sodium acrylate) of the present invention using a combination of sorbitan monooleate (Span 80), N-octylpyrrolidone (Surfadone ® LP-100) and an alkylated poly(N-vinyl-2-pyrrolidone) (Ganex ® V-216) as the emulsifier, and monoallyl maleate as the crosslinker.

The preparation method of Example 1 was repeated, except a combination of 1.50 g of N-octylpyrrolidone, 1.50 g of Ganex ® V-216, and 3.0 g of Span 80 was used as the emulsifier, and 0.0122 g of methylenebisacrylamide (0.01% on monomer) was replaced with 1.824 g of monoallyl maleate (1.5% on monomers) as the crosslinker. At the end of the reaction, the residual sodium acrylate content was measured by the GC method (measured in terms of acrylic acid and methyl acrylate), and found to be below the 0.1% detection limit. The poly(sodium acrylate) water-in-oil emulsion at 29.8% solids had a Brookfield viscosity of 2,800 cps at 25° C. The inverted poly(sodium acrylate) emulsion in water at a 0.5% and 1.0% had a Brookfield viscosity of 3,800 and 30,000 cps, respectively, at 25° C.

EXAMPLE 11: (COMPARATIVE)

Example 11 illustrates the preparation of cross-linked water-in-oil emulsions of poly(sodium acrylate) of the prior art using sorbitan monooleate (Span 80) as the sole emulsifier, and optionally, using methylenebisacrylamide as the crosslinker.

The preparation method of Example 1 was repeated, except 6.0 g of Span 80 was used as the sole emulsifier, and 0.0122 g of methylenebisacrylamide (0.01% on monomer) was used as the crosslinker. At the end of the reaction, the residual sodium acrylate content was measured by the GC method (measured in terms of acrylic acid and methyl acrylate), and found to be below the 0.1% detection limit. The poly(sodium acrylate) water-in-oil emulsion at 28.8% solids had a Brookfield viscosity of 56,000 cps at 25° C. The inverted poly(sodium acrylate) emulsion in water at a 0.5% and 1% concentration had a Brookfield viscosity of 3,000 and 6,200 cps, respectively, at 25° C. Although the thickening efficiency of this polymer is similar to the emulsion thickeners of Examples 1-10, it exhibited a significantly higher bulk viscosity than these polymers and was difficult to invert into an oil-in-water poly(sodium acrylate) emulsion.

What is claimed is:

1. In a method for the production of a water-soluble polymer wherein a water-in-oil emulsion of the corresponding monomer of the polymer is prepared using an emulsifier and subjected to polymerization in the presence of an initiator to produce the desired polymer in a water-in-oil emulsion, the improvement which comprises using as the emulsifier, a mixture of a nonionic oil-soluble surfactant and a compound selected from the group consisting of N-alkyl lactams, the amount of surfactant to compound being such that the HLB value of the mixture is not greater than about 7.

2. The method of claim 1 wherein the HLB value of the emulsifier is not more than about 6.

3. The method of claim 1 wherein the HLB value of the emulsifier is not more than about 5.

4. The method of claim 1 wherein the ratio of surfactant to lactam on a weight basis is in the range of about 4:1 to 1:2.

5. The method of claim 1 wherein the compound is an N-alkyl lactam having the formula

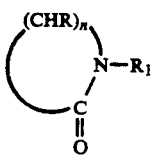

wherein
- R is hydrogen or a linear, branched or cyclic alkyl having from 1 to 18 carbon atoms and may vary between different —(CHR)— groups;
- $R_1$ is a linear, branched or cyclic alkyl having from 6 to 18 carbon atoms with the proviso that at least one of R or $R_1$ must contain at least six carbon atoms and the sum of the carbon atoms in R and $R_1$ cannot exceed 18; and
- n is 3, 4, or 5.

6. The method of claim 4 wherein the compound is a polymer having the formula

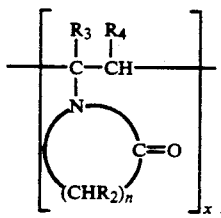

wherein
- $R_3$ and $R_4$ may be the same or different and may be hydrogen or an alkyl group containing from 6 to 30 carbon atoms and
- $R_2$ is hydrogen or a linear, branched or cyclic alkyl having from 1 to 30 carbon atoms and may vary between different —(CHR)— groups, with the proviso that at least one of $R_2$, $R_3$ or $R_4$ is alkyl;
n is 3, 4 or 5; and
x is such that the molecular weight of the polymer is from about 2,000 to 20,000.

7. The method of claim 5 wherein n is 3.
8. The method of claim 6 wherein n is 3.
9. The method of claim 1 wherein the oil-soluble surfactant is selected from the group consisting of polyethylene glycol alkyl esters, glycerine monoalkyl esters, sorbitan monoalkyl esters, saccharose esters; polyoxyalkylene alkyl ether, polyoxyalkylene alkyl aryl ether; polyoxyalkylene alkylamine; polyoxyalkylene alkylamide, aliphatic ethanolamide, methylolamide; and polyoxyalkyl sorbitan alkyl ester, polyoxyalkylene glycol alkyl ester.
10. The method of claim 1 wherein the N-alkyl lactam is a pyrrolidone having the formula

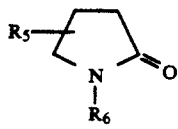

wherein $R_5$ is hydrogen or lower alkyl having from 1 to 4 carbon atoms and $R_6$ is lower alkyl having from 6 to 18 carbon atoms.

11. The method of claim 4 wherein the polymer of a N-vinyl lactam is an alkylated polyvinyl pyrrolidone having the formula

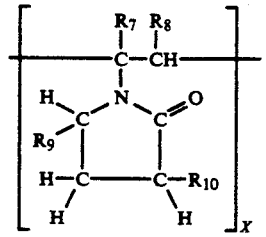

wherein
- $R_7$ and $R_8$ may be the same or different and may be representing either an alkyl group or a hydrogen. The alkyl group may contain from 6 to 30 carbon atoms,
- $R_9$ and $R_{10}$ may be the same or different and may be hydrogen or an alkyl having from 6 to 30 carbon atoms, with the proviso that at least one of $R_7$, $R_8$, $R_9$ or $R_{10}$ must be alkyl,
X is such that the molecular weight of the polymer is from about 2,000 to 20,000.

12. The method of claim 1 wherein the N-alkyl lactam is octylpyrrolidone, dodecylpyrrolidone, N-(2-ethylhexylpyrrolidone) or combinations thereof.
13. The method of claim 1 wherein the surfactant is sorbitan monooleate.
14. The method of claim 1 wherein the initiator is a combination of t-butyl hydroperoxide and ascorbic acid.
15. A water-in-oil emulsion of a polymer produced by the method of claim 1.
16. An oil-in-water emulsion of a water-soluble polymer obtained by diluting the water-in-oil emulsion of claim 15 with at least an equal volume of water.
17. In a method for the production of a water-soluble polymer wherein a water-in-oil emulsion of the corresponding monomer of the polymer is prepared using an emulsifier and subjected to polymerization in the presence of an initiator to produce the desired polymer in a water-in-oil emulsion, the improvement which comprises using as the emulsifier, a compound selected from the group consisting of alkylated polyvinyl lactams, the amount of surfactant being such that the HLB value of the mixture is not greater than about 7.
18. The method of claim 17 wherein the water-soluble polymer is a polymer of copolymer formed from a monomer selected from the group consisting of acrylic acid, methacrylic acid, itaconic acid, maleic acid, fumaric acid and salts thereof.
19. A water-in-oil emulsion of a polymer produced by the method of claim 30.
20. An oil-in-water emulsion of a water-soluble polymer obtained by diluting the water-in-oil emulsion of claim 19 with at least an equal volume of water.

* * * * *